United States Patent [19]

Spindler

[11] Patent Number: 4,696,254
[45] Date of Patent: Sep. 29, 1987

[54] FLUID WASH SPRAY PAINT SYSTEM

[75] Inventor: Irvin Spindler, Princeton, Ind.

[73] Assignee: George Koch Sons, Inc., Evansville, Ind.

[21] Appl. No.: 872,977

[22] Filed: Jun. 11, 1986

[51] Int. Cl.$^4$ ............................................. B05B 15/12
[52] U.S. Cl. ................................. 118/610; 118/603; 118/326; 427/345; 55/DIG. 46; 55/228
[58] Field of Search ...................... 118/326, 603, 610; 427/345, 421; 55/228, DIG. 46

[56] References Cited

U.S. PATENT DOCUMENTS

| 3,353,336 | 11/1967 | Caballero | 55/228 |
| 4,036,606 | 7/1977 | Zimmermann | 55/228 |
| 4,102,303 | 7/1978 | Cordier et al. | 118/326 |
| 4,261,707 | 4/1981 | Bradshaw et al. | 118/326 |
| 4,375,975 | 3/1983 | McNicholas | 55/228 X |
| 4,416,193 | 11/1983 | Sharpless | 118/326 |

FOREIGN PATENT DOCUMENTS 3414320 10/1985 Fed. Rep. of Germany ...... 118/326

OTHER PUBLICATIONS

IEC 601 Deflocculant Product Description, InVireChem, Inc., 9/82.
NALCO 8723 Product Description, NALCO Chemical Company, 8/74.
NALCO 7747-A Product Description, NALCO Chemical Company, 8/74.
Hydrocyclones, Sierra Cyclone Incorporated, 1984.

Primary Examiner—Shrive P. Beck
Attorney, Agent, or Firm—Barnes & Thornburg

[57] ABSTRACT

A fluid wash spray paint system which includes a plurality of paint spray booths is provided. Each paint spray booth includes a fluid wash device to entrap paint overspray in a moving fluid to remove the overspray from the booth. The system also includes a sludge pit for collecting the fluid and entrapped paint overspray from the plurality of spray booths. An automatic feeder is provided to introduce a deflocculant powder into the fluid and entrapped paint overspray to cause the paint to settle as sludge to the bottom of the sludge pit. A centrifugal separator is provided to separate and remove the settled sludge from the fluid and to return the fluid to the sludge pit. The system further includes a pump to circulate the fluid from the sludge pit through the plurality of fluid wash spray devices to form a closed system.

6 Claims, 3 Drawing Figures

FLUID WASH SPRAY PAINT SYSTEM

BACKGROUND AND SUMMARY OF THE INVENTION

The present invention relates to a novel system for removing paint overspray from a paint spray booth. More particularly, the present invention relates to a fluid wash spray paint system that includes a plurality of paint spray booths, each having a fluid wash device to entrap paint overspray. The fluid wash devices are coupled to a common sludge removal system which removes the pain sludge from the fluid and then recycles the fluid to form a closed system.

Conventional spray paint booths normally include a water wash eliminator section which is designed to remove paint overspray generated in the painting process from the air in the booth. Normally, a booth exhaust fan is provided which draws the air and paint overspray through a cascade of water. The water cascade separates the paint overspray from the air, and the water and paint overspray is then channeled to a reservoir. Paint overspray normally floats on the water in the reservoir. This floating paint is then removed, either manually or mechanically, by some sort of skimming device.

One problem with that type of conventional water wash system is that the paint, becuase of its composition, remains tacky and will readily adhere to exposed surfaces of the system, including the walls of the reservoir. The accumulation of the paint overspray on the system is generally detrimental to its function, and therefore necessitates cleaning of the system at frequent intervals. Another problem with that type of conventional water wash system is that it is difficult to remove much of the paint overspray from the wash water. That problem diminishes, or prevents, the ability to recycle the water back through the water wash device for an extended period of time. The wash water must be changed at frequent intervals, creating significant waste water disposal problems and inefficient spray booth usage.

Other conventional water wash systems have interconnected a number of paint spray booths having water wash devices with a common reservoir. The wash water and paint overspray from each spray booth is routed to the common reservoir where the paint overspray is then skimmed, either mechanically or manually. In this type of conventional water wash system, it is known to add a chemical which enhances the floatation of the paint. By forcing more of the paint to float on the surface, in theory more of the paint can be removed by the skimming operation. However, in practice, the addition of the floatation chemical to the water created other problems. While the addition of the floatation chemical normally causes the paint overspray to float for a period of time, a portion of the paint always seems to settle to the bottom of the reservoir. This creates two types of paint that has to be handled. The floating paint has to be skimmed from the surface of the reservoir, and the settled paint has to be removed from the bottom of the reservoir in some other manner. Generally, such conventional water wash systems had no provision for easily removing the settled paint from the bottom of the reservoir. Therefore, at regular intervals, the settled paint had to be mechanically removed from the bottom of the reservoir. This generally required that the sytem be shut down during the cleaning operation, which interrupted the painting cycle.

Other conventional water wash systems have attempted to utilize various types of separators to separate the paint overspray from the water. Generally, such separators have been unsuccessful because of the problems created by the paint floating on the surface of the water and adhering to the structure of the separator, which decreased the efficient of the separator, and created the need for frequent cleaning.

One object of the present invention is to provide a fluid wash system in which the tackiness of the paint overspray is eliminated. This will prevent the paint overspray from adhering to the surfaces of the system.

Another object of the present invention is to provide a central system that utilizes a common pit, or reservoir, and includes a separator that is capable of separating the paint overspray from the fluid to create generally clean fluid.

Another object of the present invention is to provide a system that is capable of forcing the entrapped paint overspray to settle as sludge toward the bottom of a common sludge pit.

Yet another object of the present invention is to provide a system in which the settled sludge can be removed from the fluid in a form that is easily disposable.

According to the present invention, a fluid wash spray paint system including a plurality of paint spray booths is provided. Each paint spray booth includes a fluid wash device to entrap paint overspray in a moving fluid to remove the overspray from the booth. The system also includes a sludge pit for collecting the fluid and entrapped paint overspray from the plurality of spray booths. The system further includes means for introducing a sludge-producing agent into the fluid and entrapped paint overspray to cause the paint to settle as sludge to the bottom of the sludge pit. Means for separating and removing the settled sludge from the fluid is provided along with means for circulating the fluid and sludge from the bottom of the sludge pit through the centrifugal means and returning the fluid with the sludge removed to the sludge pit. The system further includes second means for circulating the fluid from the sludge pit through the plurality of fluid wash spray devices.

One feature of the foregoing system is that a sludge-producing agent is introduced into the fluid and entrapped paint overspray to cause the paint to settle as sludge to the bottom of the sludge pit. The sludge-producing agent also serves to eliminate the tackiness of the paint overspray. One advantage of this feature is that the paint overspray is converted to a form that is relatively easy to remove from the fluid and does not adhere to the surfaces of the system itself.

Another feature of the foregoing system is that centrifugal means for separating and removing the settled sludge from the fluid is provided. One advantage of this feature is that substantially all of the settled sludge, and consequently substantially all of the paint overspray, is separated and removed from the fluid. Another advantage of this feature is that the fluid can be recycled through the fluid wash devices to form a closed system. This permits the fluid to be reused over and over again without the necessity of disposing of the fluid at frequent intervals.

In preferred embodiments of the present invention, the system includes means for agitating the fluid and the settled sludge to keep the sludge partially suspended in the fluid near the bottom section of the sludge pit. One feature of the foregoing system is that the settled sludge is not allowed to accumulate in the bottom section of th sludge pit. One advantage of this feature is that the fluid and sludge are more easily pumped from the bottom section of the sludge pit to the centrifugal means.

Also in preferred embodiments of the present invention, at least one spray nozzle is positioned above the sludge pit and adapted to spray a portion of the circulating fluid onto the fluid and sludge in the sludge pit to prevent the formation of foam. One feature of the foregoing structure is that the circulating fluid is used to dissipate and prevent foam from the agitated fluid and sludge mixture in the sludge pit. One advantage of this feature is that it eliminates the necessity for introducing a separate defoaming chemical into the fluid to dissipate the foam.

Additional objects, features, and advantages of the invention will become apparent to those skilled in the art upon consideration of the following detailed description of a prefered embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWING

Figure 1:
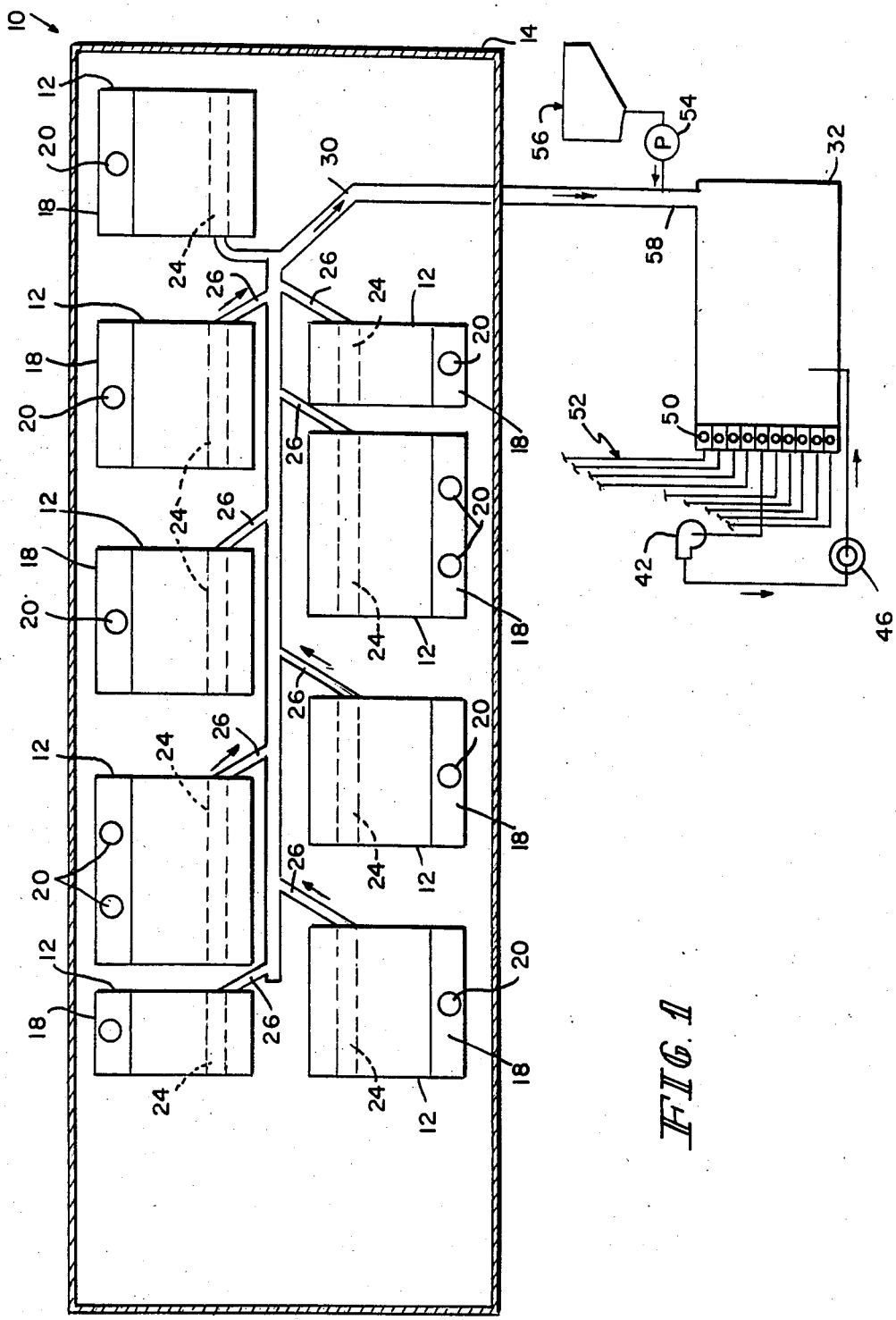
FIG. 1 is a plan view diagrammatically illustrating the fluid wash spray paint system of the present invention showing the paint spray booths and the sludge pit.

Referring now to FIG. 1, FIG. 1 shows a fluid wash spray paint system 10 constructed according to the present invention. The spray system 10 includes a number of paint spray booths 12 that are located inside a building 14. Illustratively, nine paint spray booths 12 of different sizes are shown. However, it will be understood that any number of paint spray booths 12 may be included in the paint system 10, with the number depending upon the type of desired spraying activities. Each paint spray booth 12 may be an independent spray booth in which a selected paint spraying activity is performed, or the paint spray booths 12 may be arranged in an assemblyline-like orientation which will permit an article to be painted to pass sequentially through each spray booth for a specific coating of paint.

Each paint spray booth 12 includes a conventional water wash eliminator portion 18 located near the rear section of the booth 12. Each eliminator portion 18 includes one or more booth exhausts 20 that are adapted to draw air from the paint spray booth 12. A booth trench 24 is located in the floor of each paint spray booth 12 and adapted to collect the water circulated through each water wash eliminator portion 18. A connecting trench 26 couples each booth trench 24 to a central trench 30 which leads to a common sludge pit 32. Thus, the water from each water wash eliminator portion 18 is channeled through the connecting trenches 26 to the central trench 30, and from there to the common sludge pit 32 for processing. Illustratively, the common sludge pit 32 is shown located outside the building 14 housing the individual paint spray booths 12. However, it will be understood that the sludge pit 32 could be located in any convenient position relative to the paint spray booths 12 and the building 14.

Each water wash eliminator portion 18 is designed to entrap paint overspray generated in the painting process in the water circulating through the water wash eliminator portion 18. The water and entrapped paint overspray is then channeled through the central trench 30 to the sludge pit 32. A circulation pump 42 is connected to the sludge pit 32 to pump the water and entrapped paint overspray through a hydrocyclone separator 46 to separate and remove the entrapped paint overspray from the water.

After the water is returned to the sludge pit 32 from a separator 46, this water is then pumped to each of the paint spray booths 12 by individual spray booth pumps 50. Illustratively, nine spray booth pumps 50 are shown, one spray booth pump 50 for each paint spray booth 12. Each spray booth pump 50 pumps water to each water wash eliminator portion 18 to form a closed water wash system. An outlet line 52 is provided between each spray booth pump 50 and wter wash eliminator portion 18 to carry this water from the paint spray pumps 50 to the water wash eliminator portions 18.

A deflocculant powder is introduced into the water to reduce the tackiness of the entrapped overspray and to reduce its tendency to float on the water in the sludge pit 32. The deflocculant powder causes the paint overspray to settle to the bottom of the sludge pit. The paint overspray, with the addition of the deflocculant powder, settles as a silt-like sludge that is capable of being pumped through the circulation pump 42 without adhering to any of the surfaces of the pump 42 or of the entire system in general. A clay-like deflocculant powder avialable from InVireChem, Inc. at 315 North 36th Street, Seattle, Wash. 98103 under the trade name IED 601 DEFLOCCULANT is ideally suited for this purpose.

An automatic feeder 54 is positioned to introduce the deflocculant powder into the central trench 30 at a location indicated by the number 58. A deflocculant supply container 56 is shown to provide the defloccu- lant powder to the feeder 54. Ideally, the deflocculant powder is introduced into the water at the rate of approximately 25 pounds of powder for each 1,000 gallons of water in the system. For each 11 gallons of paint overspray removed by the separator 46, approximately 7 pounds of additional deflocculant powder are added to the water. Although the additional deflocculant powder could be added at intervals as the paint overspray is removed, it has been found that an automatic feeder which adds deflocculant powder at the correct rate corresponding to the rate of removal of the paint overspray is better suited to the present system. For example, if the paint spray booths 12 are being operated such that approximately 11 gallons of paint overspray are being generated per hour, and thus approximately 11 gallons of paint overspray are being removed from the water per hour, the feeder 54 will be calibrated to introduce approximately 7 pounds of deflocculant powder per hour.

Although the IED 601 DEFLOCCULANT is preferred, two deflocculant materials available from NALCO Chemical Company, Industrial Division, at 2901 Butterfield Road, Oak Brook, Ill. 60521 and sold under the trade names NALCO 7747-A and NALCO 8723 are also usable. It will be understood that the above rates are applicable only to the preferred IEC 601 DEFLOCCULANT.

Figure 2:
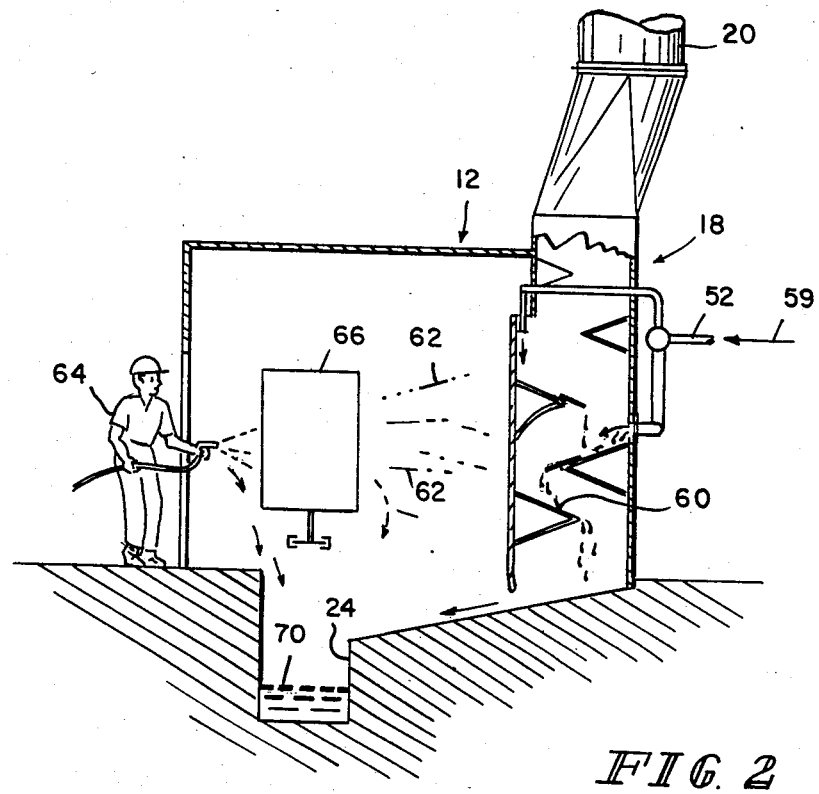
FIG. 2 is a transverse sectional view through one of the paint spray booths.

Referring now to FIG. 2, FIG. 2 shows in more detail one of the paint spray booths 12. The water wash eliminator portion 18 is shown at the rear section of the booth 12, and generally consists of a vertical air flow chamber with a booth exhaust 20 mounted on top. The booth exhaust 20 is configured to draw air from the spray booth 12 vertically upwardly through the water wash eliminator portion 18. The water wash eliminator portion 18 receives water from the sludge pit 32 (FIG. 1) through the outlet line 52 as indicated by arrow 59. The water is then directed to fall within the water wash eliminator portion 18 to form a water cascade 60. The water cascade 60 interacts with the air and paint overspray 62 to entrap and separate the paint overspray 62 from the air being pulled through the water wash eliminator portion 18. Illustratively, the paint overspray 62 is generated by an operator 64 conventionally spray painting an article 66 suspended within the paint spray booth 12.

The water and entrapped paint overspray 70 will collect in the booth trench 24 due to the slope of the floor of the paint spray booth 12. The water and entrapped paint overspray 70 will then travel via one of the connecting trenches 26 and central trench 30 to the sludge pit 32.

Figure 3:
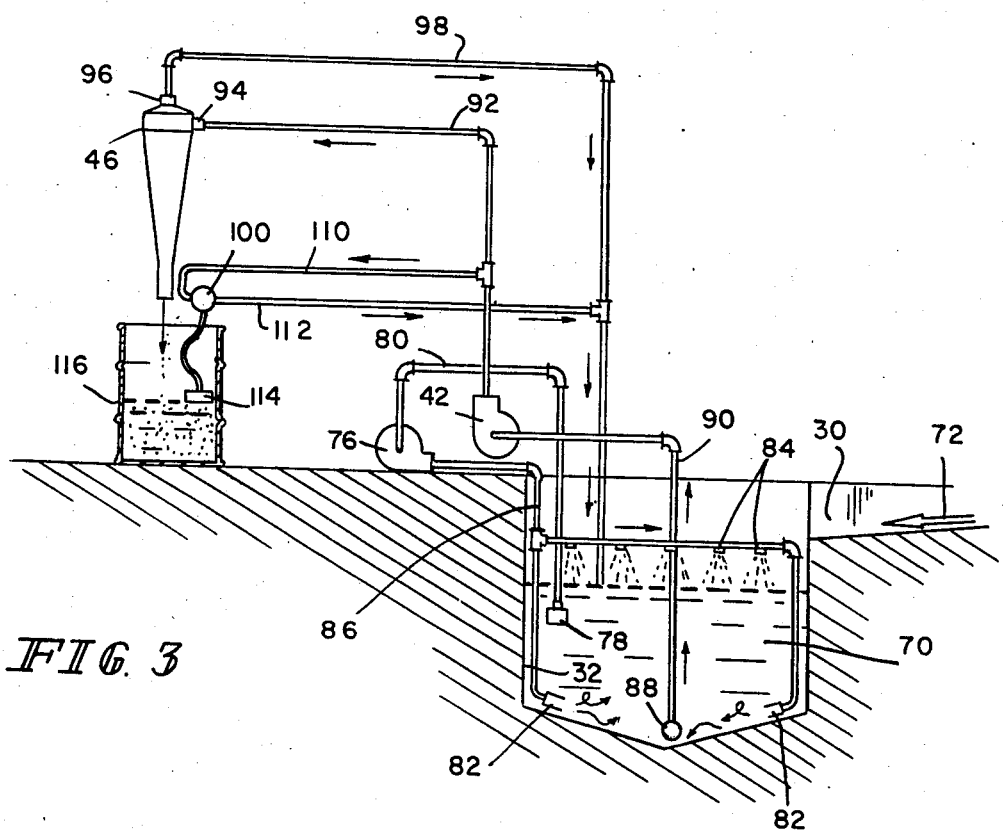
FIG. 3 is a transverse sectional view schematically depicting the sludge pit and separator.

Referring now to FIG. 3, FIG. 3 shows in more detail the sludge pit 32, and the circulation pump 42 and separator 46. The water and paint overspray 70 travels through the central trench 30 and is deposited in the sludge pit 32 as indicated by the arrow 72. Because the deflocculant powder has been added to the water, the entrapped paint overspray tends to settle as silt toward the bottom of the sludge pit 32. If left undisturbed, the paint overspray settles as silt, or sludge to the bottom of the sludge pit 32, with relatively clean water then overlaying the silt or sludge. It has been found that to effectively pump the settled sludge from the bottom of the sludge pit 32, it is advantageous to agitate somewhat the sludge and water near the bottom of the sludge pit 32. To provide this agitation, an agitation pump 76 is placed adjacent the sludge pit 32 with an intake 78 extending into the upper portion of the water in the sludge pit 32. A conduit 80 is provided to connect the intake 78 and the inlet of the agitation pump 76. The output of the agitation pump 76 is directed through a conduit 86 to agitation nozzles 82 that are located near the bottom of the sludge pit 32. The agitation pump 76 thus draws water from the upper portion of the sludge pit 32 and pumps this water through the agitation nozzles 82 to agitate the settled sludge in the bottom of the sludge pit 32. By agitating the settled sludge, the sludge is forced into suspension in the water in the lower portion of the sludge pit 32.

A portion of the output of the agitation pump 76 is directed through spray nozzles 84 located above the water level in the sludge pit 32. It has been found that, by spraying water from the agitation pump onto the surface of the water in the sludge pit, the formation of foam that might be created by the agitation nozzles 82 is prevented.

To pump the water and suspended sludge from the bottom portion of the sludge pit 32, a sump 88 is placed near the bottom of the sludge pit 32 and is connected to the intake of the circulation pump 42 by a conduit 90. The outlet of the circulation pump 42 is connected to the inlet 94 of the separator 46 by a conduit 92. The outlet 96 of the separator 46 is connected by a conduit 98 to the sludge pit 32, and specifically to the upper portion of the sludge pit 32.

To separate the sludge from the water, the agitated water and sludge in the sludge pit 32 are pumped from the sump 88, through the circulation pump 42, through the separator 46. The separator 46 is a conventional hydrocyclone separator that operates by centrifugal force to separate the heavier sludge from the lighter water, and returns the lighter water through the conduit 98 to the upper portion of the sludge pit 32. The heavier sludge is discharged from the separator 46 into a barrel 116.

Because a certain amount of water may also be discharged with the sludge from the separator 46, a conventional siphon pump 100 is positioned over the barrel 116 with a siphon intake 114 disposed within the barrel. The siphon pump 100 operates to siphon any water in the barrel 116 back to the sludge pit 32. The siphon pump 100 operates in a conventional manner by utilizing pressure developed by water flow through the siphon pump 100. Specifically, the inlet of the siphon pump 100 is connected by a conduit 110 to the conduit 92 that connects the outlet of the circulation pump 42 and the inlet 94 of the separator 46. The outlet of the siphon pump 100 is connected by a conduit 112 to the conduit 92, near its discharge end, that connects the outlet 96 of the separator 46 to the sludge pit 32. As water and sludge circulates from the circulation pump 42, a portion of this circulating water and sludge is routed through the siphon pump 100 to siphon any water in the barrel 116. This siphoned water is then returned to the sludge pit 32.

In operation, initially, clean water is added to the sludge pit 32 such that the water level is somewhat above the intake 78 for the agitation pump 76. Each spray booth pump 50 is then activated to begin pumping water to each of the water wash eliminator portions 18 in the individual paint spray booths 12. It will be understood that the intakes for the spray booth pumps 50, although not shown, are located in the upper portion of the sludge pit 32, similar to the intake 78 for the agitation pump 76. Spray painting operations are then commenced in each of the paint spray booths 12.

Referring to FIG. 2, paint overspray 62 is generated in the air of each paint spray booth 12. The air and paint overspray 62 are drawn through the water wash eliminator portion 18 by the booth exhaust 20. The water cascade 60 separates and removes the paint overspray from the air, permitting clean air to be exhausted by each booth exhaust 20. The water and paint overspray 70 run into the booth trench 24 in each paint spray booth 12. The water and paint overspray 70 from each booth trench 24 then travel by the corresponding connecting trenches 26 to the central trench 30. The combined water and paint overspray 70 from the individual paint spray booths 12 travels by the central trench 30 to the sludge pit 32.

At position 58 in the central trench 30, the automatic feeder 54 introduces deflocculant powder into the water and paint overspray 70. The addition of the deflocculant powder kills the tackiness of the paint and causes the paint to settle toward the bottom portion of the sludge pit 32. The agitation pump 76 is activated to being agitating somewhat the sludge in the sludge pit 32. The amount of agitation is controlled such that the sludge is not permitted to accumulate on the bottom of the sludge pit 32. However, the agitation level is limited to prevent the sludge from being totally agitated throughout the entire sludge pit. Ideally, the sludge is agitated such that it is suspended in the water in the bottom portion of the sludge pit, with substantially clean water then overlying this water and suspended sludge.

The circulation pump 42 is then activated to begin pumping the agitated sludge and water from the bottom portion of the sludge pit 32 through the sump 88. The water and sludge are pumped from the circulatio pump 42 to the inlet 94 of the separator 46. The water and sludge are pumped through the separator 46, with the heavier sludge being separated from the water. The separated water is then routed from the outlet 96 of the separator 46 back to the upper portion of the sludge pit 32. The sludge is discharged from the separator 46 into the barrel 116. Any water that may accompany the discharged sludge into the barrel 116 is removed by the siphon pump 100 and returned to the sludge pit 32.

To prvent any foam from being formed due to the agitation of the water and sludge, water from the upper portion of the sludge pit 32 is pumped through the spray nozzles 84 that are directed onto the upper surface of the water in the sludge pit 32. It has been found that by spraying the relatively clean water through the spray nozzles 84, that the addition of separate defoaming agent is not required.

The rate of accumulation of the sludge into the barrel 116 is monitored, with that rate being used to control the automatic feeder 54, as discussed previously. In this manner, as the sludge is removed from the system, deflocculant powder is automatically added to the water at the appropriate rate.

Because the agitation is controlled to keep the sludge suspended only near the bottom portion of the sludge pit 92, it will be understood that the upper portion of the sludge pit 92 contains relatively clean water. Thus, because the intakes for the spray booth pumps 50 are located in the upper portion of the sludge pit 32, relatively clean water is continuously being circulated through the water wash eliminator portions 18. Therefore, the fluid wash spray paint system 10 of the present invention is a completely closed system which does not require a supply of clean water to be continuously added to the water wash eliminator portions 18. The only waste generated by the system is the sludge that is deposited into the barrel 116. Because any excess water is removed from the barrel 116 by the siphon pump 100, waste disposal problems are reduced to a minimum.

Although the invention has been described in detail with reference to a preferred embodiment and specific examples, variations and modifications exist within the scope and spirit of the invention as described and defined in the folowing claims.

What is claimed is:

1. A fluid wash spray paint system comprising:
   a plurality of paint spray booths, each booth including a fluid wash device to entrap paint overspray in a moving fluid to remove said overspray from said booth;
   a sludge pit for collecting said fluid and entrapped paint overspray from the plurality of spray booths, said pit having a bottom section;
   means for introducing a sludge-producing agent into said fluid and entrapped paint overspray to cause said paint to settle as sludge to said bottom section of said sludge pit;
   centrifugal means for separating and removing said settled sludge from said fluid;
   first means for circulating said fluid and sludge from said bottom section of said sludge pit through said centrifugal means and returning said fluid to said sludge pit;
   second means for circulating said fluid from said sludge pit through said plurality of fluid wash spray devices;
   means for agitating said fluid and said settled sludge located in said sludge pit to keep said sludge partially suspended in said fluid near said bottom section of said sludge pit, and
   at least one spray nozzle located above said sludge pit and adapted to spray a portion of said circulating fluid and sludge onto the said fluid and sludge agitated by said agitating means.

2. The system of claim 1, further comprising a trench that interconnects said plurality of paint spray booths and said sludge pit to place said plurality of spray booths and said sludge pit in fluid communication.

3. The system of claim 2, wherein said introducing means is positioned to introduce said sludge-producing agent into said trench.

4. The system of claim 1, wherein said fluid consists of water.

5. A water wash spray paint system comprising;
   a series of paint spray booths arranged in an assemblyline configuration and equipped to apply a particular coat of paint to at least one article to be painted, each booth including a water wash device to entrap paint overspray in moving water to remove said overspray from said booth;
   means for conveying said article through said series of paint spray booths;
   a sludge pit for collecting said water and entrapped paint overspray from the series of paint spray booths; said pit having a bottom section and an upper section;
   a trench interconnecting said series of paint spray booths and said sludge pit to place said series of spray booths and said sludge pit in fluid communication;
   means for introducing a sludge-producing agent into said water and entrapped paint overspray to cause said paint to settle as sludge toward said bottom section of said sludge pit;
   means located in said sludge pit for agitating the sludge and water to keep said sludge partially suspended in the water near said bottom section of said sludge pit;
   a separator for separating and removing said sludge from said water;
   a first circulating pump for circulating said water and sludge from said bottoms ection of said sludge pit through said separator and returning said water with said sludge removed to said sludge pit; and
   a second circulating pump for circulating said water from the upper section of said sludge pit through said fluid wash spray device, and
   at least one spray nozzle located above said upper section of said sludge pit and configured to spray a portion of said circulating water and sludge onto said water and sludge in said sludge pit to dissipate any foam created by the agitation of said water and sludge.

6. In a water wash spray paint system having a plurality of paint spray booths, each booth including a water wash device to entrap paint overspray in moving water to remove the paint overspray from the booth, a method of removing the paint overspray from the water comprising the steps of:

providing a common sludge pit for collecting the water and entrapped paint overspray from the plurality of spray booths, said pit having a bottom section and an upper section;

interconnecting said plurality of paint spray booths and said sludge pit to place said spray booths and said sludge pit in fluid communication;

introducing a sludge-producing agent into said water and entrapped paint overspray to cause said paint to settle as slude toward said bottom section of said sludge pit;

agitating the sludge and water near said bottom section of said sludge pit to partially suspend said sludge in the water near said bottom section of said sludge pit;

circulating said water and sludge from said bottom section of said sludge through a centrifugal separator to separate and remove said sludge from said water and returning the separated water to said sludge pit;

spraying a portion of said circulating water and sludge onto the water and sludge in said sludge pit to dissipate any foam created by the agitation of said water and sludge in said sludge pit, and pumping said water from the upper section of said sludge pit through said water wash devices.

* * * * *